United States Patent Office 2,760,121
Patented Aug. 21, 1956

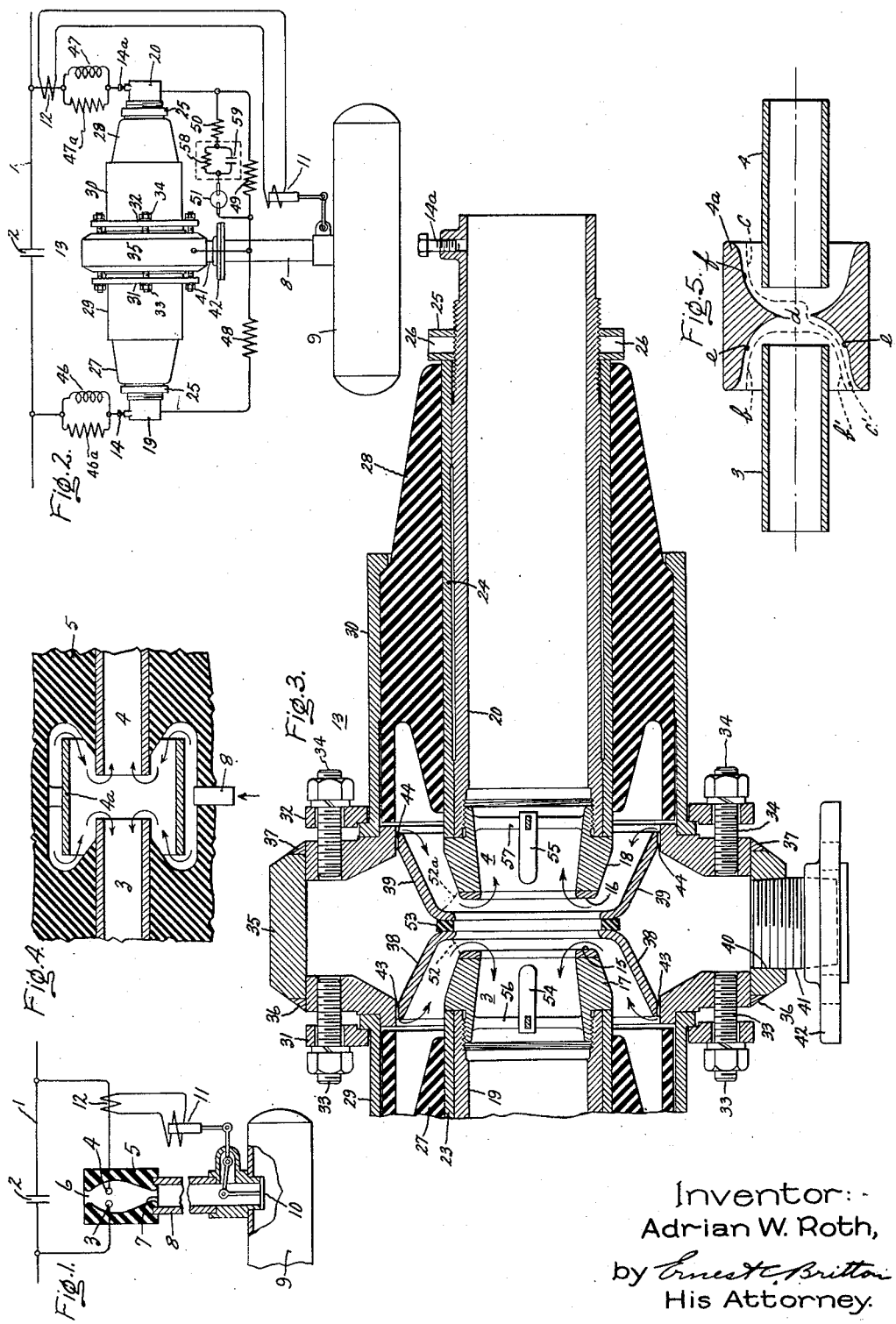

2,760,121

ELECTRIC PROTECTIVE DEVICE

Adrian W. Roth, Media, Pa., assignor to General Electric Company, a corporation of New York Application March 4, 1952, Serial No. 274,694

21 Claims. (Cl. 317—12)

My invention relates to overvoltage protective devices of the gap type and, particularly, to such devices which are especially adapted to prevent excessive voltages from occurring across series capacitors connected in high voltage alternating current power circuits.

A series capacitor is an electrostatic condenser or a bank of such condensers which is connected in series in an alternating current power circuit either directly or through a series transformer to neutralize in whole or in part the inductance of the circuit and thereby improve the voltage regulation of the system. When the circuit is a high voltage, long distance transmission line which transmits electric power between synchronous dynamoelectric machines of an electric power system, the series capacitor materially increases the stability limits of the power system. That is to say, it increases the amount of electric power that can be transmitted between the terminal machines of a given power circuit before they pull out of synchronism, and it also increases the ability of the system to withstand electrical shocks such as those which arise from switching operations or from faults on the system.

It is well known that the voltage across a series capacitor is directly proportional to the current flow through it. Accordingly, since the current in a power line under fault conditions or under transient conditions resulting from switching operations may exceed the normal full load current, the voltages produced across a series capacitor in such a power line may reach such high values under such abnormal high current conditions that it would be very expensive to construct the capacitor to safely withstand such high voltages. Consequently, it has been the usual practice to use a series capacitor designed to withstand a relatively low voltage impressed across its terminals and to provide it with protective equipment which completes a short circuit around the capacitor when the voltage across it tends to exceed a predetermined value. However, the short circuiting of such a series capacitor removes the regulating effect thereof from the power system so that the stability limits of the system are reduced. Consequently, it is desirable to remove the short circuit from around the series capacitor terminals as quickly as possible after the abnormal condition producing the excessive voltage across the capacitor ceases to exist.

Various arrangements have been proposed heretofore for establishing the short circuit around the series capacitor upon the occurrence of an excessive voltage across it. One such arrangement comprises a pair of spaced electrodes which are respectively connected to the terminals of the capacitor so that the two electrodes and the gap between them normally constitute a nonconducting current path around the capacitor. With such an arrangement a predetermined excessive voltage across the capacitor breaks down the gap so that an arc is established between the two electrodes. Due to the low impedance of the arc, a short circuit is thereby established between the capacitor terminals and hence the voltage drop produced across the terminals by the fault current in the circuit is reduced to a relatively low value.

In order to extinguish the arc of such an over-voltage protective device as soon as possible after the condition causing the abnormal voltage condition ceases to exist, it has been common practice to provide such a device with an arrangement for causing a blast of fluid under pressure to flow across the arc after it has been established. As heretofore constructed, however, such over-voltage protective devices of the gap type have not functioned entirely satisfactorily as overvoltage protective devices for series capacitors because of the change in the breakdown voltage occurring across the gap as a result of the establishment of an arc, and the flow of pressure fluid thereacross. For such service it is essential that the arc-over voltage characteristic of the gap should be such that immediately after the arc current passes through zero at the end of each half cycle, the voltage required to break down the gap should be substantially the same as that required to establish the initial breakdown. Also changes in atmospheric conditions should not materially affect the arc-over voltage characteristic of the gap. None of the known prior art devices of the gap type has had these essential characteristics.

One object of my invention is to provide an improved overvoltage protective device of the gap type which has substantially the same arc-over voltage characteristic under all zero current conditions existing across the gap.

A further object of my invention is to provide an improved overvoltage protective device of the gap type in which the arc-over voltage of the device immediately following each current zero is substantially the same as it was before the arc was established between the electrodes.

Another object of my invention is to provide an improved overvoltage protective device of the gap type in which the heat of the arc and the back pressure produced in the arc chamber by the arc do not materially affect the arc-over voltage characteristic of the device.

A still further object of my invention is to provide an improved overvoltage protective device of the gap type, the arc-over voltage characteristic of which is not materially affected by changes in atmospheric conditions.

In accordance with my invention a predetermined amount of pressure fluid which is sufficient to absorb the arc energy without causing thermal ionization of the fluid is supplied at a constant rate to an arc chamber surrounding the spaced electrodes of the overvoltage protective device in response to the establishment of an arc between the electrodes of the device. This constant rate of fluid supply is obtained by taking advantage of the well known fact that the amount of fluid through a given orifice from a source of constant fluid pressure remains substantially constant and flows through the orifice at the speed of sound as long as the fluid pressure at the inlet end of the orifice is greater than 1.88 times the maximum possible fluid pressure at the outlet end of the orifice. Therefore, I make the pressure of the fluid source at the inlet end of the orifice sufficiently greater than it is at the outlet end so that even for the maximum back pressure produced in the arc chamber by the arc, the pressure at the inlet end of the orifice is always greater than 1.88 times the arc chamber pressure. The maximum arc chamber pressure depends upon the maximum short circuit current occurring at a particular capacitor location. In this way, a uniform flow of the desired amount of pressure fluid into the arc chamber is obtained under all operating conditions of the device. Also in accordance with my invention the total area of the outlet passages from the arc chamber to the atmosphere is such that the density of the fluid between the electrodes in the arc chamber when pressure is being supplied to the arc chamber does not increase sufficiently to effect a substantial increase in the voltage at which an arc is established between the electrodes. Also in accordance with my invention the arc chamber has a volume such that while the predetermined amount of pressure fluid is being supplied thereto, the flow of pressure fluid through the chamber scavenges the chamber quickly enough so that any change in the density of the pressure fluid therein resulting from the peak values of instantaneous current during each half cycle of arc current do not materially affect the voltage required to break down the gap between the electrodes after the next instantaneous current zero.

Furthermore, in accordance with a preferred embodiment of my invention the walls of the arc chamber of the device are constructed of current conducting material and insulating material arranged in such a manner that the conducting portion of the walls absorbs heat radiated by the arc so as to protect the insulating material therefrom. Also the conducting portion of the chamber walls is so shaped and spaced relative to the main electrodes of the device that the conducting portion may be employed in conjunction with a trigger circuit so as to function as a trigger electrode for establishing in response to the abnormal voltage condition an initial arc between the trigger electrode and one of the main electrodes. The resulting initial arc current flows through the trigger electrode and the main electrode and may be made to produce on the arc a magnetic blow effect which may be aided by the flow of fluid pressure into the arc chamber to cause the initial arc to be transferred to the main electrodes. Also an improved trigger circuit provided for use in conjunction with the trigger electrode insures that irrespective of changes in atmospheric conditions that affect the arc-over voltage characteristic of the main gap the initial arc is always established in response to a predetermined voltage. Means may also be provided for insuring that the arc after it is established between the main electrodes, is maintained at a predetermined definite length by the pressure fluid flowing into the chamber.

Other objects and features of my invention will appear and my invention will be better understood from the following description when taken in connection with the accompanying drawing and the scope of my invention will be pointed out in the appended claims.

For a better understanding of the invention, reference may be had to the accompanying drawing, in which Fig. 1 is a schematic representation partially in section of one embodiment of the invention, in which Fig. 2 is an overall external view of another embodiment of the invention, in which Fig. 3 is a view in section of a portion of the apparatus shown in Fig. 2 and in which Figs. 4 and 5 represent modifications of Fig. 3.

With reference to Fig. 1, the numeral 1 represents one conductor of an electric power system. The numeral 2 represents a series capacitor or a bank of capacitors arranged in series with the conductor 1. It will be understood that series capacitors such as are represented at 2 could be connected in each phase of a polyphase transmission or distribution system. Arranged in shunt circuit relationship with the capacitor 2 is a pair of electrodes 3 and 4 which are spaced apart to form a gap, the spacing of which determines the voltage level for which the capacitor 2 is protected provided atmospheric conditions such as barometric pressure, temperature, and humidity are neglected. Electrodes 3 and 4 are mounted within an enclosing structure or chamber 5 which is formed at least in part of insulating material and which is provided with an exhaust port or outlet 6 and a throttled inlet orifice 7. Fluid is supplied through the inlet 7 by way of conduit 8 from the fluid reservoir 9. The fluid flow is controlled by means of the schematically represented valve 10 which in turn is controlled by a suitable electromagnetic device 11 which is energized from any suitable means such as the transformer 12 having its primary winding connected in series with electrodes 3 and 4.

Should a fault occur somewhere on the system comprising conductor 1, the increase in current flow due to the fault increases the voltage across capacitor 2. Assuming that the increase in voltage across capacitor 2 is sufficient in magnitude, an arc is subsequently established between electrodes 3 and 4. Flow of current across the arc gap between the electrodes actuates electromagnetic device 11 to open valve 10 thereby to supply pressure fluid from tank 9 through conduit 8 and inlet 7 to the electrodes 3 and 4 within the chamber 5. In accordance with my invention the pressure fluid is supplied to the chamber in such a manner that the pressure surrounding those electrodes is relatively low, of the order of less than one atmosphere gauge pressure so that it does not materially increase the dielectric strength in the region surrounding the electrodes 3 and 4 and permits the reestablishment of the arc after each current zero when the voltage across electrodes 3 and 4 is above the normal voltage breakdown value of the gap. However, as soon as the fault is cleared, as by the opening of a protective breaker, for example, so that the instantaneous voltage across the gap remains below its normal breakdown value, the dielectric strength of the medium around the electrodes 3 and 4 is such that this breakdown value cannot reestablish the arc after any current zero but if the voltage increases above the normal breakdown voltage, the arc is immediately reestablished between the electrodes.

In accordance with my invention the amount of fluid supplied to the arc chamber 5 is sufficient to absorb the heat energy of the arc without causing thermal ionization of the fluid and this amount of fluid is supplied at a constant rate through the inlet 7 irrespective of the back pressure produced in the arc chamber by the arc between the electrodes 3 and 4. In order to determine the rate at which the fluid must be supplied to the chamber it is necessary first to determine the amount of heat energy that the fluid has to absorb from the arc without causing thermal ionization of the fluid. The arc energy $P_a$ may be expressed as follows:

$$(1) \qquad P_a = V_a \times I_{sc} \times \frac{\sqrt{2} \times 2}{\pi}$$

Where $V_a$ is the arc voltage in kilovolts, $I_{sc}$ is the R. M. S. value of the arc current and the $$\frac{\sqrt{2} \times 2}{\pi}$$

is the factor which converts an R. M. S. value of current to an average value of current in amperes.

Since the kilovolt-ampere rating $P_{sc}$ of a protective device embodying the invention may be arbitrarily defined as follows:

$$(2) \qquad P_{sc} = V_p \times I_{sc}$$

Where $V_p$ is the number of kilovolts required to break down the gap between the electrodes 3 and 4 and $I_{sc}$ is the R. M. S. value of arc current in amperes. The arc energy $P_a$ can now be expressed as a function of the kva. rating of the device by combining (1) and (2) as follows:

$$(3) \qquad P_a = \frac{V_a}{V_p} \times P_{sc} \times \frac{\sqrt{2} \times 2}{\pi}$$

The length of the air gap $L_g$ between the electrodes 3 and 4 may be expressed as:

$$(4) \qquad L_g = \frac{V_p}{E}$$

Where E represents the voltage breakdown gradient at the minimum ambient condition expressed in kilovolts per inch, $L_g$ may also be expressed as:

$$(5) \qquad L_g = \frac{V_a}{E_a}$$

Where $V_a$ is the arc voltage in kilovolts and $E_a$ represents the arc voltage gradient in kilovolts per inch. It follows from (4) and (5) that $$(6) \qquad \frac{V_p}{E} = \frac{V_a}{E_a}$$

or $$\frac{E_a}{E} = \frac{V_a}{V_p}$$

Combination Equations 3 and 6 it will be seen that $$(7) \qquad P_a = P_{sc} \times \frac{E_a}{E} \times \frac{\sqrt{2} \times 2}{\pi} = P_{sc} \times K_1$$

where $K_1$ is a constant which is equal to the fraction $$\frac{\sqrt{2} \times 2}{\pi} \times \frac{E_a}{E}$$

Thus if E is assumed to be 20 kilovolts per inch and $E_a$ to be .1 kilovolt per inch, it will be seen that the arc energy $P_a$ is equal to $4.50 \times 10^{-3}$ times the kva. rating of the device.

As mentioned heretofore, the temperature in the region of the spaced electrodes 3 and 4 is to be maintained at all times at a value below the thermal ionization temperature which according to present knowledge is estimated at approximately 4,000° centigrade absolute. Since the energy output of the alternating current arc varies according to a sine wave, the peak energy is approximately:

1.7×the average energy

Assuming an additional safety factor of 1.1, a desirable average air temperature in the region of the spaced electrodes 3 and 4 is 2300° centigrade absolute or roughly 2,000° centigrade.

Having analyzed the arc energy in terms of the defined kva. rating of the device and having determined what the maximum average air temperature in the region of the electrodes 3 and 4 is to be, it is now feasible to determine the rate of flow of air in the region of the arc necessary to absorb the arc energy so as not exceed this maximum average air temperature. The specific heat of air, $c_v$, is assumed to be .28 kilocalories per cubic meter per degree centigrade, which when expressed in terms of kilowatt seconds per cubic meter per degree centigrade is equal to 1.17. The rate of flow of air F, therefore is:

$$F = P_{sc} \times K_1 \times \frac{1}{C_v \times T}$$

where T is the temperature in degrees centigrade at which the arc chamber is to be maintained so that $$F = P_{sc} = \frac{4.50 \times 10^{-3}}{1.17 \times 2000}$$

$$F = P_{sc} \times 1.9 \times 10^{-6} = P_{sc} \times K_2$$

where $$K_2 = 1.9 \times 10^{-6}$$

For instance, assuming as an example for a particular application of the invention:

$$I_{sc} = 10,000 \text{ A}$$
$$V_p = 40 \text{ kv.}$$

then:

$F = 0.76$ cubic meters/second $= 27.0$ cubic feet per second

As a practical matter, it has been found that the constant $K_2$ may vary between $1.5 \times 10^{-6}$ and $3.5 \times 10^{-6}$.

In accordance with my invention the rate of flow of air through the region of electrodes 3 and 4 must be substantially unaffected by the effect of the arc energy which will tend to build up pressure within the chamber 5. This condition is accommodated by taking advantage of the fact that the velocity of flow through the inlet orifice 7 is equal to the speed of sound when the pressure in the storage tank 9 is more than 1.88 times the back pressure downstream from the orifice 7 in the region of the gap electrodes 3 and 4 and making the tank pressure sufficiently high so that it is always more than 1.88 times the maximum possible back pressure. An upper limit of the back pressure in chamber 5 can be determined on the assumption that the heat developed by the arc appears entirely as an increase in pressure. For a chamber having a constant volume it is well known that the pressure of a fluid therein varies directly with the temperature thereof. Thus assuming a normal atmospheric temperature of 15° centigrade or 288° centigrade absolute in the tank 9, a ratio between this temperature and the maximum chamber temperature of 2000° centigrade will determine the relationship between atmospheric pressure and the maximum pressure in chamber 5 pursuant to the assumption that the arc heat appears entirely as an increase in pressure.

Thus:

$$\frac{2000° + 273° = 2273° \text{ centigrade absolute}}{15° + 273° = 288° \text{ centigrade absolute}} = 7.8$$

Accordingly, the maximum pressure that could occur in the chamber if the entire energy of the arc was converted into heat would be 7.8 times the normal atmospheric pressure of 15 pounds per square inch. In order to obtain a constant rate of fluid supply into the arc chamber 5 during such a change in the arc chamber pressure, the supply pressure in the tank 9 should be $7.8 \times 15 \times 1.88$ or 220 pounds per square inch.

Due to a number of factors including the fact that the rate of fluid flow increases with the temperature, the back pressure will not reach the above-mentioned maximum. Thus, it has been found that a constant tank pressure of 150 pounds per square inch is sufficient to ensure continuity of a constant rate of flow of fluid to the arc chamber.

Assuming that $\Delta$ is the percentage variation up or down from a normal voltage breakdown level it is desired to maintain across the gap electrodes and assuming that the electrodes are spaced so as to break down at a certain voltage below the normal breakdown level by $\Delta$ per cent initially, i. e. at atmospheric pressure with no blast in chamber 5, then the air density in the region of the gap electrodes when a blast is being supplied thereto must not be greater than:

$$(1 + 2\Delta) \times \text{atmospheric density}$$

where unity represents the lower limit of permissible breakdown voltage. The reduction in air density in the region of the gap electrodes during peak current values in each half cycle due to the increase in air temperature must be compensated at most within less than one-half cycle in order to reach at the next zero instantaneous current a condition of normal breakdown strength.

With known relationships of fluid flow through orifices, the rate of fluid flow, the pressure of the supply, and the density of air in the interrupting chamber fully determine the cross-sectional area of the inlet or throttling orifice 7 and of the exhaust orifice 6. For example, the supply or inlet orifice area for the above specific example of rate of flow, supply pressure, and air density can be determined as follows:

Assume the temperature of air in the supply tank to be 15° centigrade, the velocity of flow at 15° centigrade to be 340 meters per second, the temperature of air in the supply orifice to be 34° centigrade and assume the following designations and values:

$P_o$ (atmospheric pressure) $=1\times 10^4$ kilograms per square meter $P_s$ (supply pressure) $=16\times 10^4$ kilograms per square meter $F_s=$ velocity through the inlet orifice of 323 meters per second $R=$ air density in the inlet orifice $R_o=$ air density in supply tank $$\frac{R}{R_o}=0.63$$

$F=$ rate of flow of air in cubic meters per second $$F_s\times\frac{R}{R_o}\times\frac{P_s}{P_o}\times S_s=F$$

where $S_s$ represents the inlet orifice area in square meters $$S_s=\frac{F}{F_s}\times\frac{R_o}{R}\times\frac{P_o}{P_s}$$

$$S_s=\frac{0.76}{323\times 0.63\times 16}=2.34\times 10^{-4} \text{ square meters}$$

$S_s=2.34$ square centimeters $=0.363$ square inches

As a practical matter in the case of the above example, I have found that the inlet orifice area should not exceed 0.37 square inch and should not be less than 0.22 square inch.

The pressure and density within the region of the gap electrodes are maintained at low values by suitable choice of the cross-sectional area of the exhaust. The theory of electric breakdown in fluid media teaches that the arc-over voltage is a direct function of fluid density. Normally it is advantageous to set the gap between electrodes 3 and 4 so that the voltage at which the initial arc is established is a value corresponding to the lower limit of the range of tolerable breakdown voltages. Thus if the range of tolerable voltages extends to a value 122% of the lower limit then the ratio 1.22 results in an exhaust velocity of .52 times the velocity of sound assuming zero velocity at the breakdown path. Of course such an assumption is plausible as a practical matter only if the electrodes 3 and 4 are disposed a substantial distance from the exhaust. If the electrodes 3 and 4 are arranged at the exhaust orifice in a suitable fashion then the velocity at the gap can be made to just approach the speed of sound. Depending upon the shape of the electrodes forming the exhaust openings, the exhaust velocities are chosen between 0.5 and 1 times the speed of sound since the actual configuration is a compromise between the above two extremes. For the particular example set forth above where $$F=27 \text{ cubic feet per second}$$

the exhaust area would require two exhaust orifices each being two inches in diameter.

Independently from the above consideration involving the arc energy, a simple ratio between orifices satisfying the following air flow pattern can be developed: high pressure source, inlet orifices (sonic flow), interrupting chamber (region of the main gap), and the exhaust orifices (subsonic flow).

I found above that a suitable pressure for the fluid stored in the source is $16\times 10^4$ kilograms per square meter. This air is submitted to a temperature drop of approximately 50° centigrade in exhausting through the inlet orifice. For reason of energy conservation, the air in the interrupting chamber will again be of the temperature in the storage tank. These conditions are also affected by the amount of heat given to and taken from the walls. Summarily taking these considerations into account by a temperature factor $K_T$ of the order of magnitude 1.2, an equation can be written based on the principle of the continuity of flow. I shall neglect the temperature influence on soundspeed with varying source pressures and also the contraction factors of flow in the orifices.

$$K_T\times F_s\times S_s\times\frac{P_s}{P_o}\times 0.53=V_{EX}\times S_{EX}$$

where $V_{EX}$ and $S_{EX}$ are the velocity of flow and area of the exhaust. Unknown besides the variable $$S_{EX}/S_S$$

is only the exhaust speed $V_{EX}$. This value can be calculated from the relation $$V_{EX}=\sqrt{2gh}$$

The $h$ value or head corresponding to $0.22\times 10^4$ kilograms per square meter, i. e. $(1.22-1)\times$ atmospheric pressure affords a relative pressure in the interrupting chamber of:

$$h=\frac{0.22\times 10^4}{1.29}=0.17\times 10^4 \text{ meters of air}$$

Therefore $$V_{EX}=\sqrt{2\times 9.81\times 0.17\times 10^4}=182 \text{ meters per second}$$

and finally:

$$\frac{S_{EX}}{S_S}=1.2\times\frac{323}{182}\times\frac{P_s}{P_o}\times 0.53=1.13\times\frac{P_s}{P_o}$$

$$\frac{S_{EX}}{S_S}=K_4\times\frac{P_s}{P_o}$$

Due to the possibility of using slightly higher values as interrupter chamber pressure, due to variations in sound velocity in the supply orifice, I have found as a practical matter that the constant $K_4$ should have the following values:

$K_4$ equal to or more than 0.6 and less than 2.

The small influence of the arc energy and temperature on the air density affords a basis for describing the present interrupter as having a constant air density arc chamber in contrast to the constant pressure arc chambers which characterize conventional air blast interrupters.

The above equations show nevertheless that the density is not entirely constant. A further means therefore has to be applied to assure that normal density is restored when required. This can be realized by the speed of the scavenging action. The volume of the interrupter chamber already played a part in the assumption that the air supplied to the chamber would be immediately heated to exhaust temperature. This latter condition could, of course, only be realized in a chamber of small volume.

The scavenging action requires a small volume chamber. From the density equation it is apparent that the density might drop as low as .5 at current peaks. In order to have a reasonable scavenging of this effect, the interrupting chamber volume must be kept below a value which corresponds to the air flow in time determined by the voltage recovery. Assuming this time to be one-half cycle, which means $8.33\times 10^{-3}$ seconds in the case of a sixty cycle system: then $$V_{CH\ max}=P_{sc}\times 1.9\times 10^{-6}\times 8.33\times 10^{-3}$$

$$V_{CH\ max}=P_{sc}\times 1.58\times 10^{-8}$$

For the above example, we would have to keep the volume below:

$$V_{CH}=6.32\times 10^{-3} \text{ cubic meters}$$

or $$V_{CH}=405 \text{ cubic inches}$$

For duties where the recovery rate of voltage can be particularly low (as for the protection of series capacitors) where peak voltages are reached only after a full cycle, this critical volume can be larger by a factor of 2.

$$(2 \times 1.58 = 3.16)$$

so that $$V_{CH} = P_{sc} \times 3.16 \times 10^{-8} \text{ cubic meters}$$

$$V_{CH} = P_{sc} \times K_3$$

$K_3 = 1.58 \times 10^{-8}$ cubic meters/kva.

In view of the above, it will be seen that the constant $K_3$ may vary as indicated and is representative of the volume of the enclosing chamber expressed in terms of the kva. rating of the device.

As has already been stated, Fig. 1 is a schematic representation of one form of the invention. Fig. 3 is a practical preferred embodiment of one form which the chamber 5, inlet orifice 7, and exhaust orifice 6, as well as the electrodes 3 and 4 of Fig. 1, may take.

In Fig. 3, device 13 comprises main coaxially disposed tubular electrodes 3 and 4, having tips 15 and 16, respectively, which preferably are constructed of graphite or some metal of high melting point. The tips 15 and 16 are ring-shaped and are mounted upon the adjacent ends of the coaxially disposed, tubular shaped body portions 17 and 18 of the electrodes. Body portions 17 and 18 are respectively engaged by a threaded connection to the tubular conductors 19 and 20, which serve as exhaust or outlet means leading to atmosphere from the chamber in which the main electrodes are disposed. Conductors 19 and 20 are in electrical contact with the terminals 14 and 14a, which are connected across a device to be protected, such as a series capacitor. Disposed about the tubular members 19 and 20 are the metallic sleeves 23 and 24. Members 19 and 20 are held in position by any suitable means such as by a nut 25, which is shown in engagement with the sleeve 24. The gap may be made smaller by interposing suitable washers (not shown) between parts 17 and 18 and parts 23 and 24, respectively. The nut 25 is provided with apertures 26 for receiving the lugs of a wrench. Disposed about the metallic sleeves 23 and 24 are the insulators 27 and 28, respectively. Insulators 27 and 28 are secured in position by clamping sleeves 29 and 30, respectively, which in turn are held in position by the ring members 31 and 32 and their cooperating bolts 33 and 34, which are screwed into the intermediate or third electrode comprising a ring member 35 and symmetrically disposed annular nozzle members formed of two parts 38 and 39 which are welded to ring member 35 at 36 and 37. The ring member 35 is provided at its lower portion with an opening 40, which is connected by a short conduit 41 and a flange member 42 to a suitable conduit, not shown in Fig. 3, such as is depicted at 8 in Fig. 1 and which preferably would be constructed of insulating material. Also, as is shown in Fig. 3, the part 38 is provided with a plurality of orifices 43, while the part 33 is provided with a plurality of orifices 44. These orifices 43 and 44, being inlet means, serve as throttling means for regulating the pressure supplied through conduits 8 and 41, the cavity formed between the two annular parts 38 and 39 and the ring member 35, and thence to the region of electrodes 3 and 4. Fluid which is supplied through the openings 43 and 44 flows in the direction of the arrows through the tips 15 and 16, and electrode body portions 17 and 18, and the tubular members 19 and 20 to atmosphere. The openings 43 and 44 which correspond to the inlet 7 of Fig. 1 should be constructed in accordance with the above discussion of Fig. 1, and the tubular members 19 and 20 should be constructed in accordance with the above discussion of exhaust outlet 6 of Fig. 1.

In Fig. 2, the capacitor protective device 13 of Fig. 3 is shown from an external view with the terminals 14 and 14a electrically connected across the terminals of the series capacitor 2 through inductive reactance means 46 and 47, which are respectively arranged in parallel with resistors 46a and 47a. These elements are for the purpose of limiting the current peak of the discharge of capacitor 2.

In order to establish a substantially constant voltage level at which an arc is drawn, a trigger circuit as shown in Fig. 2 may be used. This circuit may comprise impedance means 48, 49, and 50, and device 51. As an example, the impedances are shown as resistors. Resistor 48 is connected between terminal 14 and the annular structure 35, while resistor 49 is connected between terminal 14a and ring-like structure 35.

Experimental work conducted in conjunction with this invention indicates that for a device which is to protect a capacitor rated at 16 kilovolts, at a voltage level of approximately 40 kilovolts, the resistors 48 and 49 should have a value of between 2 and 4 megohms, while the resistor 50 should have a value of resistance between 5,000 and 10,000 ohms.

If the intermediate electrode formed of the annular orifice members 38 and 39 and the ring member 35 has an equal capacitance with respect to the terminals 14 and 14a, and if a housing is provided whose potential is the mean potential of the terminals 14 and 14a, impedance means 48 and 49 can be omitted. The device 51 is a sealed tube preferably having its enclosure evacuated and filled with a suitable inert gas, such as nitrogen, for example. Since the device 51 is a sealed device, the electrodes are isolated from atmosphere and the voltage at which an arc can be established in device 51 will not vary appreciably. More rapid interruption of the small trigger current in device 51 may be achieved by a resistor 58 arranged in parallel with the capacitor 59.

Preferably resistor 58 should have a resistance of approximately 1 megohm, and capacitor 59 should have a capacitance of 1000 mmf.

When a voltage condition develops across capacitor 2 which is above the protective level, an arc is established between the terminals of device 51, thereby immediately reducing substantially that portion of the voltage across capacitor 2 which is applied between terminals 14a and ring-like member 35, thereby applying a much larger than normal voltage to terminal 14 and the ring-like member 35. In this way, an arc is established between electrode 3 and ring member 38 as is indicated by the dotted line 52 shown in Fig. 3. This arc 52 in turn shifts instantaneously the potential of the intermediate or third electrode having parts 38 and 39, in such a way that the voltage across capacitor 2 is applied in parallel to the gap formed by the ring member 39 and electrode 4, the resistor 50, and the resistor 58 in parallel with capacitor 59. This will establish an arc indicated by the dotted line 52a.

For the purpose of facilitating the transfer of the arcs 52 and 52a from the annular nozzle members 38 and 39 to the center of the arcing chamber, i. e., between the main electrodes 3 and 4, the annular orifice members 38 and 39 may be separated at their inner periphery by means of insulating ring member 53. If desired, the insulating member 53 could be provided with radially extending openings, not shown, through which pressure fluid could flow in order to improve the dielectric strength of the member 53. With the arrangement just described, it would be obvious that current flowing, for example, from terminal 14 through tubular members 19 and 17, arc 52, and ring member 38 defines a loop circuit, the magnetic effect of which is to move the arc 52 downwardly and toward the right. In like manner, the nozzle member 39 and parts 18 and 20 define a loop circuit, the magnetic effect of which tends to move the arc 52a downwardly and to the left. This movement can also be obtained by the flow of pressure fluid through the nozzle openings 43 against the arc and outwardly through the tubular electrodes 3 and 4 without the aid of the above loop circuit, if desired. Furthermore, the ionized condition in the region of the arc is an aid in causing the arcs 52 and 52a to bridge the insulating member 53 so as to form a single arc extending along the axes of the electrodes 3 and 4. The extinguishment of the arc between electrodes 3 and 4 due to the action of the low pressure fluid flowing outwardly to atmosphere through the tubular members 19 and 20 occurs at each current zero.

Since it is not desirable to cause the arc between electrodes 3 and 4 to become unduly long due to the necessity for dissipating the heat of the arc, arc limiting electrodes 54 and 55 may be mounted within and in electrical contact with the electrodes 3 and 4. Any tendency for the arc to become lengthened will be prevented due to the known tendency for the arc to establish itself between the opposed ends of the arc limiting electrodes 54 and 55. Electrodes 54 and 55 can be supported within the electrodes 3 and 4 in any suitable manner such as by the spiders 56 and 57.

It will be understood that for certain applications of the invention, a certain variation in breakdown voltage could be tolerated so that the arrangements of Figs. 1 and 2 would perform satisfactorily without the trigger circuit including device 51.

Fig. 4 represents a simplified modification of the arrangement shown in Fig. 3 wherein appreciable variations in the breakdown voltage can be tolerated and wherein satisfactory performance for some applications of the invention can be achieved without the use of a trigger circuit such as is shown in Fig. 2. In Fig. 4, air is supplied through conduit 8 to the insulating enclosing structure 5 and flows as indicated by the arrows to the region of the spaced tubular electrodes 3 and 4 which, as indicated, project into the intermediate electrode 4a. Fig. 4 brings out the particular utility of the intermediate electrode as a heat shield for the insulating structure 5, thereby to absorb heat radiated by the arc so as to protect the insulating material therefrom. In an arrangement constructed according to Fig. 4, the capacitance between electrode 4a and other metal parts tends to maintain electrode 4a at midpotential.

The arrangement shown in Fig. 5 is a modification of that shown in Fig. 3. Fig. 5 incorporates an intermediate electrode which is particularly adapted to cooperate with a trigger circuit such as is shown in Fig. 2. It will be observed that the intermediate electrode 4a is provided with an inwardly projecting sharp-edged portion d disposed in the mid-plane between electrodes 3 and 4. Dotted lines b and c in the upper half of Fig. 5 represent loci of points of equal potential when the electrode 4a is at mid-potential. In this case, dotted lines b and c and the surfaces e and f are nearly parallel, and the edge of the projection d is not in a high stress region. If, however, the potential of intermediate electrode 4a becomes unsymmetrical, then the loci of points of equal potential may be represented as in the lower half of Fig. 5 by the dotted lines b' and c', in which event the edge of the projection d is in a region of high stress and facilitates the establishment of an arc between electrodes 4 and 4a. Thus, the arrangement of Fig. 5 is particularly adapted for use in conjunction with a trigger circuit such is shown in Fig. 2.

While I have shown and described particular embodiments of my invention, I do not wish to be limited to the particular structure and arrangements shown and described and intend in the appended claims to cover all such changes and modifications as fall within the true spirit and scope of my invention.

What I claim as new and desire to secure by Letters Patent in the United States is:

1. An overvoltage protective device comprising a chamber having an inlet and an outlet, a pair of spaced electrodes disposed within said chamber, and means for supplying a fluid blast to said chamber through said inlet in response to the establishment of an arc between said electrodes, and means operable to maintain the fluid within said gap at a substantially constant density for substantially all zero current conditions existing across said gap during the time said fluid blast is being supplied to the gap, said constant density being substantially equal to the gas density immediately preceding initial arc-over, the area of said outlet being such that the density of the fluid between said electrodes when fluid is being supplied thereto does not increase sufficiently to effect a substantial increase in the voltage at which an arc is established between said electrodes.

2. An alternating current overvoltage protective device comprising a chamber having an inlet and an outlet, a pair of spaced electrodes disposed within said chamber, and means for supplying a fluid blast to said chamber through said inlet in response to the establishment of an arc between said electrodes, and means operable to maintain the fluid within said gap at a substantially constant density for substantially all zero current conditions existing across said gap during the time said fluid blast is being supplied to the gap, said constant density being substantially equal to the gas density immediately preceding initial arc-over, the volume of said chamber being such that the flow of fluid through the chamber scavenges the chamber quickly enough so that any change in the density of the fluid therein resulting from the peak values of instantaneous current during each half cycle of arc current do not materially affect the voltage required to break down the gap between said electrodes immediately after the next instantaneous current zero.

3. An electric protective device comprising a pair of main electrodes spaced apart to define a main gap therebetween, a third electrode disposed adjacent said gap and forming a portion of the wall of a chamber in which said main gap is disposed, another portion of the wall of said chamber being formed of insulating material, and means for supplying a fluid blast to said chamber in response to the establishment of an arc therein, the blast being supplied in a direction to drive the arc away from said insulating material, said third electrode traversing the flow path of said fluid blast and being so shaped that said main electrodes project into said third electrodes whereby said third electrode acts to absorb heat radiated by the arc so as to protect said insulating material therefrom.

4. An electric protective gap device comprising a chamber, a pair of main hollow tubular electrodes in said chamber, said electrodes being substantially coaxially disposed and spaced apart to define therebetween a main gap, a third annular electrode in said chamber and substantially coaxially disposed with respect to said main electrodes and surrounding said main gap, and means for supplying air to said chamber, said tubular electrodes affording communication between the inside of said chamber and atmosphere.

5. An electric protective device comprising a chamber, a pair of main hollow tubular electrodes in said chamber, said electrode being substantially coaxially disposed and spaced apart to define therebetween a main gap, a third annular electrode in said chamber and substantially coaxially disposed with respect to said main electrodes and surrounding said main gap, and means including an orifice leading into said chamber for supplying fluid to said chamber when an arc is established between two of said electrodes during an abnormal line condition, said tubular electrodes affording communication between the inside of said chamber and atmosphere, and means operable to maintain the fluid within said gap at a substantially constant density for substantially all zero current conditions existing across said gap during the time said fluid is being supplied to the gap, the total inside cross-sectional area of said main electrodes being such that the density of the fluid between said electrodes when fluid is being supplied thereto does not increase sufficiently to effect a substantial increase in the voltage at which an arc is established between said electrodes.

6. An alternating current electric protective device comprising a chamber, a pair of main hollow tubular electrodes in said chamber, said electrodes being substantially coaxially disposed and spaced apart to define therebetween a main gap, a third annular electrode in said chamber and substantially coaxially disposed with respect to said main electrodes and surrounding said main gap, and means for supplying air to said chamber when an arc is established between two of said electrodes during an abnormal line condition, said tubular electrodes affording communication between the inside of said chamber and atmosphere, and means operable to maintain the fluid within said gap at a substantially constant density for substantially all zero current conditions existing across said gap during the time said fluid is being supplied to the gap, the volume of said chamber being such that the flow of air through the chamber scavenges the chamber quickly enough so that any change in the density of the air therein resulting from the peak values of instantaneous current during each half cycle of arc current do not materially affect the voltage required to break down the gap between said electrodes immediately following the next instantaneous current zero.

7. An electric protective device comprising a pair of hollow main tubular electrodes substantially coaxially disposed and spaced apart to define therebetween a gap, a third annular electrode substantially coaxially disposed with respect to said main electrodes and surrounding said gap, one surface of said third electrode forming a portion of a wall of a chamber in which the adjacent ends of said main electrodes are disposed and another surface of said third electrode forming a portion of an annular cavity, a plurality of orifices affording communication between said cavity and the region of said gap, and means for supplying pressure fluid to said cavity, said tubular electrodes affording communication between the region of said gap and atmosphere.

8. An electric protective device comprising a pair of hollow main tubular electrodes substantially coaxially disposed and spaced apart to define therebetween a gap, a third annular electrode substantially coaxially disposed with respect to said main electrodes and surrounding said gap, one surface of said third electrode forming a portion of a wall of a chamber in which the adjacent ends of said main electrodes are disposed and another surface of said third electrode forming a portion of an annular cavity, a plurality of orifices affording communication between said cavity and the region of said gap, and means for supplying pressure fluid to said cavity, said tubular electrodes affording communication between the region of said gap and atmosphere and the pressure of fluid in said cavity being greater than 1.88 times the maximum possible pressure in said chamber.

9. An electric protective device comprising a pair of hollow main tubular electrodes substantially coaxially disposed and spaced apart to define therebetween a gap, a third annular electrode substantially coaxially disposed with respect to said main electrodes and surrounding said gap, one surface of said third electrode forming a portion of a wall of a chamber in which the adjacent ends of said main electrodes are disposed and another surface of said third electrode forming a portion of an annular cavity, a plurality of orifices affording communication between said cavity and the region of said gap, and means for supplying pressure fluid to said cavity, said tubular electrodes affording communication between the region of said gap and atmosphere and the total inside cross-sectional area of said main electrodes being such that the density of the fluid between said electrodes when pressure fluid is being supplied thereto does not increase sufficiently to effect a substantial increase in the voltage at which an arc is established between said electrodes.

10. An alternating current electric protective device comprising a pair of hollow main tubular electrodes substantially coaxially disposed and spaced apart to define therebetween a gap, a third annular electrode substantially coaxially disposed with respect to said main electrodes and surrounding said gap, one surface of said third electrode forming a portion of a wall of a chamber in which the adjacent ends of said main electrodes are disposed and another surface of said third electrode forming a portion of an annular cavity, a plurality of orifices affording communication between said cavity and the region of said gap, and means for supplying pressure fluid to said cavity, said tubular electrodes affording communication between the region of said gap and atmosphere, the volume of said chamber being such that the flow of fluid through the chamber scavenges the chamber quickly enough so that any change in the density of the fluid therein resulting from the peak values of instantaneous current during each half cycle of arc current do not materially affect the voltage required to break down the gap between said electrodes immediately following the next instantaneous current zero.

11. An electric protective device comprising a chamber, a pair of main hollow tubular electrodes in said chamber, said electrodes being substantially coaxially disposed and spaced apart to define therebetween a main gap, an intermediate annular electrode disposed in said chamber and substantially coaxially disposed with respect to said main electrodes and surrounding said main gap, said third electrode having an inwardly projecting sharp edged portion disposed in the mid-plane between said main electrodes, a normally non-conductive trigger circuit interconnected between one of said main electrodes and said intermediate electrode, said trigger circuit being rendered conductive in response to voltages thereacross in excess of a predetermined value for substantially reducing the voltage between said intermediate electrode and said one main electrode, and means for supplying air to said chamber, said tubular electrodes affording communication between the inside of said chamber and atmosphere.

12. An overvoltage protective device comprising a chamber having an inlet and an outlet, a pair of spaced main electrodes disposed in said chamber, an intermediate electrode disposed in the region of said main electrodes, a normally non-conductive trigger circuit including a pair of spaced terminals disposed in a gas tight enclosure interconnected between one of said main electrodes and said intermediate electrode, said trigger circuit being rendered conductive in response to voltages thereacross in excess of a predetermined value for substantially increasing the voltage between said intermediate electrode and the other main electrode, and means for supplying a fluid blast to said chamber through said inlet in response to the establishment of an arc between said electrodes, and means operable to maintain the fluid within said gap at a substantially constant density for substantially all zero current conditions existing across said gap during the time said fluid blast is being supplied to the gap, said constant density being substantially equal to the gas density immediately preceding initial arc-over, the area of said outlet being such that the density of the fluid between said electrodes when fluid is being supplied thereto does not increase sufficiently to effect a substantial increase in the voltage at which an arc is established between said electrodes.

13. An overvoltage protective device comprising a chamber having an inlet and an outlet, a pair of spaced main electrodes disposed in said chamber, an intermediate electrode disposed in the region of said main electrodes, a normally non-conductive trigger circuit including a pair of spaced terminals disposed in a gas tight enclosure interconnected between one of said main electrodes and said intermediate electrode, said trigger circuit being rendered conductive in response to voltages thereacross in excess of a predetermined value for substantially increasing the voltage between said intermediate electrode and the other main electrode, and means for supplying a fluid blast to said chamber through said inlet in response to the establishment of an arc between said electrodes and means operable to maintain the fluid within said gap at a substantially constant density for susbtantially all zero current conditions existing across said gap during the time said fluid blast is being supplied to the gap, said constant density being substantially equal to the gas density immediately preceding initial arc-over, the volume of said chamber being such that the flow of fluid through the chamber scavenges the chamber quickly enough so that any change in the density of the fluid therein resulting from the peak values of instantaneous current during each half cycle of arc current do not materially affect the voltage required to break down the gap between said electrodes immediately after the next instantaneous current zero.

14. In combination, a pair of generally coaxially disposed main tubular electrodes spaced apart to define therebetween a main gap, a third electrode extending about said gap and defining a conductive path which extends in a direction radially outwardly from the common axis of said main electrodes and longitudinally with respect to said main electrodes whereby to form a loop circuit for current flowing between said third electrode and said main electrodes, the magnetic action of said loop circuit being effective to urge the arcs drawn between said main electrodes and said third electrode in a direction toward said common axis, a normally non-conductive trigger circuit interconnected between one of said main electrodes and said third electrode, said trigger circuit including a pair of spaced electrodes disposed in a gas tight enclosing envelope.

15. In combination, a pair of main hollow tubular electrodes substantially coaxially disposed and spaced apart to define a main gap therebetween, a third annular electrode substantially coaxially disposed with respect to said main electrodes and surrounding said main gap, said third electrode comprising two annular radially-extending members insulatingly spaced apart at their radially inner ends, each of said members generally surrounding a portion of one of said main electrodes and being conductively connected together effectively only at points radially outward of said inner ends, whereby each of said members is disposed with respect to a different one of said main electrodes so as to form therewith a loop circuit, said loop circuits being effective to urge the arcs drawn between said main electrode and the parts of said third electrode in such a direction as to facilitate the transfer of the arcs from the respective parts of said third electrode to the center of said main gap.

16. An electric protective device comprising a pair of main hollow tubular electrodes susbtantially coaxially disposed and spaced apart to define therebetween a main gap, a third annular electrode susbtantially co-axially disposed with respect to said main electrodes and surrounding said main gap, said third electrode having an inwardly projecting sharp-edged portion substantially coinciding with the midplane between said main electrodes, enclosing structure in which said third electrode and the adjacent ends of said main electrodes are disposed, said enclosing structure and said third electrode being arranged to define an annular cavity, means for supplying air under pressure to said cavity, and inlet means affording communication between said cavity and the region of said main and third electrodes, said tubular electrodes affording communication between the inside of said enclosing structure and atmosphere, a normally non-conductive trigger circuit interconnected between one of said main electrodes and said third electrode, said trigger circuit including a pair of spaced electrodes disposed in a gas-tight enclosing envelope.

17. An electric protective device comprising a gap located in an arcing chamber, a source of air under pressure, inlet means to the arcing chamber, and outlet means from said chamber, said inlet means and said outlet means being so arranged that the exhaust air passes across said gap, the ratio of the area of the outlet means to the area of the inlet means being more than 0.6 times the ratio of the source pressure to atmospheric pressure, said source pressure being at least equal to that required to maintain an essentially constant flow rate through said inlet means irrespective of the back pressure produced in said chamber by arcing.

18. An overvoltage protective device comprising a chamber having an inlet and an outlet, a pair of spaced electrodes disposed within said chamber and defining a gap therebetween, said protective device having at operating atmospheric conditions a kva. rating $$(P_{sc}) = V_p \times I_{sc}$$

where $V_p$ is the number of kilovolts required to break down the gap between the electrodes and $I_{sc}$ is the R. M. S. value of arc current in amperes, means for supplying a fluid blast to said chamber through said inlet in response to the establishment of an arc at the gap between said electrodes, flow control means including said chamber for maintaining a substantially constant density of the fluid within said gap for all zero current conditions existing during the time said fluid blast is being supplied, said density being substantially equal to that gas density immediately preceding initial arc-over, said flow control means including means maintaining a pressure at the upstream side of said inlet at greater than 1.88 times the maximum possible fluid pressure at the downstream side of said inlet, the volume of said chamber in cubic meters being less than $3.16 \times 10^{-8} \times P_{sc}$.

19. An overvoltage protective device comprising a chamber, a pair of hollow tubular electrodes in said chamber, said electrodes being spaced apart to define therebetween a gap, means for supplying fluid to said chamber in response to the establishment of an arc between said electrodes, said tubular electrodes affording communication between the inside of said chamber and atmosphere, and arc-limiting electrodes mounted within said tubular electrodes and in electrical contact with said tubular electrodes.

20. An overvoltage protective device comprising a chamber having an inlet and an outlet, a pair of spaced electrodes disposed within said chamber and defining a gap therebetween, means for supplying an arc-extinguishing fluid blast to said chamber through said inlet in response to the establishment of an arc between said electrodes during an abnormal line condition, and flow control means including said chamber for causing said blast in the absence of an intervening arc-over to substantially completely scavenge the gap of ionized fluid within one half cycle after the cessation of current flow at each current zero across the gap, said flow control means thereafter acting until a subsequent arc-over to maintain the fluid within the gap at a density which is substantially equal to the fluid density immediately preceding initial breakdown.

21. An overvoltage protective device comprising a chamber having an inlet and an outlet, a pair of spaced electrodes disposed within said chamber and defining a gap therebetween, said protective device having at operating atmospheric conditions a kva. rating $$(P_{sc}) = V_p \times I_{sc}$$

where $V_p$ is the number of kilovolts required to break down the gap between the electrodes and $I_{sc}$ is the R. M. S. value of arc curent in amperes, means for supplying a fluid blast to said chamber through said inlet in response to the establishment of an arc at the gap between said electrodes, flow control means including said chamber for maintaining a pressure at the upstream side of said inlet at greater than 1.88 times the maximum possible fluid pressure at the downstream side of said inlet, the volume of said chamber in cubic meters being less than $3.16 \times 10^{-8} \times P_{sc}$, and the ratio of the area of said outlet to the area of said inlet being between 0.6 to 2.0 times the ratio of said upstream pressure to atmospheric pressure.

References Cited in the file of this patent

UNITED STATES PATENTS

| | | |
|---|---|---|
| 1,477,306 | Alcutt | Dec. 11, 1923 |
| 2,351,988 | Marbury | June 20, 1944 |
| 2,391,758 | Wade | Dec. 25, 1945 |
| 2,567,413 | Van Ryan | Sept. 11, 1951 |
| 2,597,012 | Marbury | May 20, 1952 |
| 2,620,453 | Beese | Dec. 2, 1952 |

OTHER REFERENCES

"Factors Influencing the design of High-Voltage Air Blast Circuit Breakers," volume 96, part II, No. 52, pages 557–570 of the publication: "Proceedings of the Institute of Electrical Engineers," August 1948.